US008031617B2

(12) United States Patent
Mogul et al.

(10) Patent No.: US 8,031,617 B2
(45) Date of Patent: Oct. 4, 2011

(54) FAST DETECTION OF PATH FAILURE FOR TCP

(75) Inventors: Jeffrey C. Mogul, Menlo Park, CA (US); Mallikarjun Chadalapaka, Roseville, CA (US); Randolph B. Haagens, Roseville, CA (US); Richard F. Wrenn, Colorado Springs, CO (US); Richard J. Wagner, Vernonia, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1043 days.

(21) Appl. No.: 11/495,931

(22) Filed: Jul. 28, 2006

(65) Prior Publication Data

US 2008/0025226 A1 Jan. 31, 2008

(51) Int. Cl.
*G01R 31/08* (2006.01)
*G06F 11/00* (2006.01)

(52) U.S. Cl. .................................. 370/241; 370/242

(58) Field of Classification Search .............. 370/242
See application file for complete search history.

(56) References Cited

U.S. PATENT DOCUMENTS

| 5,710,885 | A * | 1/1998 | Bondi ............................ 709/224 |
| 7,350,208 | B1 * | 3/2008 | Shoham ........................ 718/102 |
| 2002/0174207 | A1 * | 11/2002 | Battou ........................... 709/223 |
| 2003/0016624 | A1 * | 1/2003 | Bare ............................... 370/217 |
| 2003/0200315 | A1 * | 10/2003 | Goldenberg et al. ......... 709/225 |
| 2004/0042464 | A1 * | 3/2004 | Elzur et al. ............... 370/395.52 |
| 2004/0085894 | A1 * | 5/2004 | Wang et al. ................... 370/216 |
| 2005/0063328 | A1 * | 3/2005 | Dunagan et al. ............. 370/324 |
| 2006/0227725 | A1 * | 10/2006 | Huotari et al. ................ 370/254 |

OTHER PUBLICATIONS

Braden, R. RFC 1122. "Requirements for Internet Hosts—Communication Layers" Oct. 1989.*
Braden, R., "Requirements for Internet Hosts—Communication Layers", RFC 1323, Internet Engineering Task Force, Oct. 1989. [Online] Retrieved on Oct. 19, 2006 from http://www.ietf.org/rfc/rfc1122.txt—107 pages.
Jacobson, R. et al., "TCP Extensions for High Performance", RFC 1323, Internet Engineering Task Force, May 1992 [Online] Retrieved on Oct. 19, 2006 from http://www.ietf.org/rfc/rfc1323.txt. 33 pages.
Medina, A. et al., "Measuring the Evolution of Transport Protocols in the Internet", Computer Communication Review, 35(2):37-52, Apr. 2005. [Online] Retrieved on Oct. 19, 2006 from http://www.icir.org/tbit/TCPevolution-Mar2005.pdf. 15 pages.
Stewart, R. et al., "Stream Control Transmission Protocol". RFC 2960, Network Working Group, Oct. 2000. [Online] Retrieved from http://www.lietf.org/rfc/rfc2960.txt on Oct. 19, 2006—118 pages.

* cited by examiner

*Primary Examiner* — Huy Vu
*Assistant Examiner* — Stephen J Clawson

(57) ABSTRACT

A system and method for detecting path failure in a network are described. The system and method include a network interface which receives packets over particular connections, and an agent able to monitor the network interface and start a no-traffic timer for each particular connection when a packet is received on the connection. The agent is further able, when the no-traffic timer expires, to check for outgoing data on the particular connection, and compare a count of previously sent test packets against a limit. If the count is below the limit the agent sends a new test packet on the particular connection, the test packet provides an indication of the state of a network path associated with the particular connection. If the count is above the limit the agent initiates failover procedures for the associated path.

9 Claims, 5 Drawing Sheets

FAST DETECTION OF PATH FAILURE FOR TCP

TECHNICAL FIELD

The concepts described herein related to a computer networks, and more particularly to a method and system for quickly detecting failures in network-layer connectivity.

BACKGROUND OF THE INVENTION

The Transmission Control Protocol (TCP) is one of the core protocols of the Internet protocol suite. Using TCP, applications on networked hosts can create connections to one another, over which they can exchange data or packets. In the Internet protocol suite, TCP is the intermediate layer between the Internet Protocol (IP) below it, and an application above it. Applications often need reliable pipe-like connections to each other, whereas the Internet Protocol does not provide such streams, but rather only unreliable packets. TCP does the task of the transport layer in the simplified OSI model of computer networks.

One of the strengths of TCP is its ability to guarantee reliable delivery data. TCP accomplishes this reliability by tolerating packet loss through (most generally) timing out and repeatedly retransmitting. Because of the time-out and retransmit mechanism used by TCP, it will take TCP a long time to detect a failed path in the network.

Generally, a failed path will be seen by a TCP sender as a "lost packet", which is in turn detected because a data carrying packet that the sender has transmitted is not acknowledged by the receiver within a timeout period. However, not all lost packets imply path failure. In fact, it is quite common for IP packets to be dropped somewhere in the network resulting from the "best-efforts" delivery model that is intentionally part of the IP design (it would be very undesirable to require guaranteed-delivery at the IP level for reasons well understood in the art). Transient packet loss is caused either by network congestion (when a router queue overflows) or data corruptions (e.g., because of errors on a wireless link). TCP normally assumes that a packet loss indicates network congestion, and so TCP normally retransmits lost packets multiple times, with the goal of ensuring reliable delivery.

TCP also effectively reduces its transmission rate to compensate for the implied congestion. Otherwise, the too-aggressive use of retransmissions would worsen the network congestion. In times of no packet loss, TCP gradually increases its transmission rate, to try to maximize network utilization.

The choice of timeout for detecting packet loss is a compromise. If the timeout is too long, TCP will not utilize the available network capacity, and the overall throughput of useful data will be less than optimal. However, if the timeout is too short, TCP will retransmit too soon (too aggressively) and will cause unnecessary congestion, which can actually have a worse effect on overall throughput.

TCP, therefore, uses an adaptive algorithm to set its timeout value, There is an initial timeout value that is dynamically set based on measurements of the round-trip time (RTT) and its variance. The retransmission timeout starts out with this value, but with a lower bound (typically one second) so that it never exceeds a limit of one retransmission per second. However, each time a retransmission fails to elicit a response within the current timeout period, the timeout is doubled, up to a configured maximum, and TCP re-attempts retransmission. Because of this "exponential backoff," which is specified so as to prevent congestion, TCP can take a long time to realize that detect failed network paths (i.e., that there is a persistent failure of connectivity, rather than transient packet loss due to causes such as congestion).

If fast link detection is a priority, it would be a mistake to tune TCP's timeout and retransmission mechanisms solely for fast failure detection, since this can lead to network congestion through excessively aggressive retransmission as described. Instead another mechanism for quickly detecting path failure would be desirable.

Previous solutions for fast path failure detection, other than waiting for TCP to detect the failure, fall into several categories. First. using a TCP keepalive timer: TCP includes an optional "keepalive" timer, which sends a special TCP probe packet if the connection has been idle for 2 hours. This is a rather long time to detect path failure; also, the keepalive mechanism is not meant for use when there is pending data to send. Other path failure detection schemes use a periodic heartbeat: For example, the SCTP transport protocol periodically exchanges "heartbeat" packets when no other data is being sent. This can detect path failures, but the recommended heartbeat interval is 30 seconds. This could be too long for useful failover, but a shorter heartbeat could create excessive network loads. Also, the heartbeat mechanism is not meant for use when there is pending data to send.

Other schemes modify the TCP retransmission mechanism parameters: Given that the normal TCP mechanisms take too long to detect path failure, it would be possible to detect path failures faster by changing parameters. However, reducing the interval between retransmission timeouts can lead to network congestion. Note that TCP normally "probes" the path using a full-sized data packet. There are various TCP mechanisms that cause TCP to prefer to send the largest possible amount of data with each packet. As one cause of packet loss is congestion rather than path failure sending large packets as network probes may actually exacerbate the problem. In fact, in many contexts, congestion is far more likely than path failure. So it is inadvisable to do excessive full-packet probing when there is a possibility of congestion. since it is likely to make congestion worse, perhaps even converting minor congestion into apparent path failure.

Yet another scheme sends periodic ICMP pings: If sending large packets as probes is a problem, one alternative is to send small non-TCP packets as probes for path connectivity. The obvious implementation is to send an ICMP protocol Echo Request packet at intervals, expecting an Echo Reply packet in response. Because these packets are near-minimal in length, they are less likely to contribute to congestion than TCP retransmissions would. However, an excessive ping rate could still add to congestion. If the pinging process is not intelligent enough to be aware of the status of the TCP connection, there is still an undesirable compromise between pinging too frequently (and thereby wasting bandwidth and CPU time), and pinging too rarely (and failing to detect failure soon enough). Test pings may also need to be sent over paths that are not currently in use for TCP data transfer (and so which need not be monitored for failure), thereby wasting network and CPU resources.

In summary, previous solutions suffer one or more of the following flaws: slow detection of path failures; contributing to network congestion; wasting network resources; wasting CPU (host) resources; injecting multiple probes, using TCP's retransmission mechanism, into the network when there are multiple connections between hosts, even when only one is necessary, thereby further increasing congestion.

BRIEF SUMMARY OF THE INVENTION

The concepts described herein relate to a system and method for fast detection of failed network connections. In one embodiment a method for detecting path failure in a network is described. The method includes receiving a packet over a particular connection, and starting a timer for the particular connection. If the timer expires before data is received on the connection, the method checks for outgoing data on the particular connection, and compares a per-peer count of previously sent test packets against a limit. If the count is below the limit the method sends a new test packet on the particular connection, the test packet provides an indication of the state of a network path associated with the particular connection.

In another embodiment, a system for detecting path failure in a network having a network layer and a transport layer, the system being part of a networked device connected to the network over a plurality of network connections is described. The system includes a network interface operable to provide network functionality for the networked device, and an agent logically separate from the network interface and aware of the state of the network interface. The agent is operable to measure a time since a packet was last received for at least one of the plurality of network connections and to cause a test packet to be sent by the network interface when the measured time is greater than a limit. The test packet provides an indication of the state of the at lest one of the plurality of network connections.

In yet another embodiment, a method for detecting path failure for TCP connections in a network is described. The method uses an agent in a networked device having transport protocol processing separate from the agent. The method includes monitoring a per-connection retransmission count for each network connection to determine if the count is above a low-water mark, and monitoring a per-peer inactivity time using a timer, the timer set to a round trip transmission time estimate. If the inactivity timer expires and the method determines there are active tasks waiting for the particular network connection, the method sends a test packet over the particular network connection as long as the troubled connections retransmission count is above the low-water mark. The test packet provides an indication of the status of the network connection.

DETAILED DESCRIPTION OF THE INVENTION

The concepts described herein relate to a system and method for fast path failure detection for TCP. Embodiments of the system and method use a small-packet, low-delay probing mechanism that is aware of the state of the TCP connection. Awareness of the TCP connection means that probing only happens when there is pending data to send, there is an immediate need for connectivity, but TCP progress might be stalled resulting in connectivity being in doubt. In these circumstances probing is then done with small packets, rapidly but for a bounded interval, so that a high-confidence check for connectivity can be made without adding a lot of network overhead.

Another mechanism, according to the concepts described herein, for limiting excessive use of test packets which might add congestion to the network is configuring embodiments of the system and method to monitor all connections to a remote peer for activity. Activity on any connection would indicate that the underlying path has not failed despite repeated timeouts in one or more of the connections. Further, test packets, or pings, are only sent on a per-peer, or per-path basis instead of a per-connection basis further limiting the number of test packets that needs to be sent to determine the status of all the connection using that peer, or path. By monitoring all connections and using per-peer test packets or probes, probing incidence is greatly suppressed and does not increase with the number of connections to a peer. Embodiment of the system and method described here also avoid the use of complex data structures or expensive communication mechanisms between software components.

Using the system and method described herein, network path failures can be rapidly detected before a transport (or higher) layer is likely to do so. This allows systems employing the mechanism to maintain an uninterrupted and transparent level of service to external clients of the distributed system. Rapid failure detection is accomplished without significantly increasing the chances of network congestion. This fast failure detection and path failover is valuable in systems that need to tolerate partial network failure without significantly reducing availability.

Figure 1:
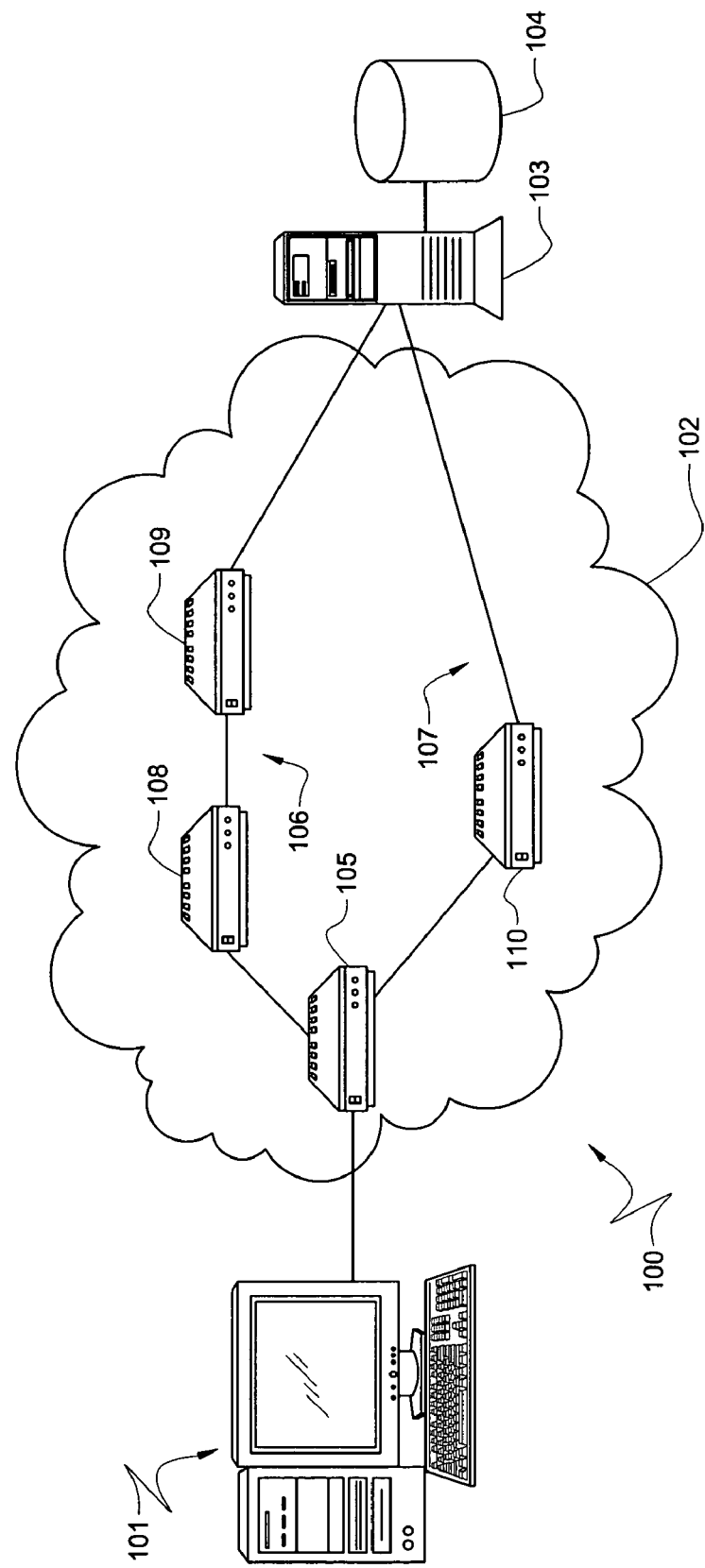
FIG. 1 is a simplified block diagram of a network to illustrate a system and method according to the concepts described herein.

Referring now to FIG. 1, a simplified block diagram illustrating a TCP/IP network is shown. System 100 shows a connection between a user's terminal 101 and a network resource 103 over a TCP/IP network 102. System resource 103 may be a distributed storage system which includes storage 104 connected to network 102 through a controller or server as illustrated by resource 103. User 101 connects to network 102 using router 105. Router 105 can chose between multiple physical paths to pass data between user 101 and resource 103. Examples of such multiple paths are path 107 using router 110 and path 106 using routers 108 and 109. Paths 106 and 107 are only shown to illustrate the operation of the fast path failure system and method according to the concepts described herein and are not meant to be limiting or to describe actual connections or network paths.

According to embodiments of a method for fast path failure detection, which will be described in greater detail with reference to FIGS. 2 through 4, when system resource 103 has a connection established with user 101 over, for example path 107, if progress is stalled on the TCP connection, embodiments of the present invention can send small test packets for a bounded interval over path 107 to determine if the problems with the TCP connection are due to path failure or other network issue such as congestion. If the test packets determine that there is a path failure, system resource 103 can then be directed to reestablish communication with user 101 over an alternate path, such as path 106. This method will find a path failure much more quickly than waiting for the original TCP connection to time out, and therefore, allows system resource 103 to failover to a different path ensuring greater accessibility, reliability and utilization for system resource 103.

The actual mechanism for implementing the system and method for fast path failure detection in network resource 103, according to the concepts described herein, can be any combination of software and hardware in resource 103 to achieve the desired results. The system and method may be implemented solely in software running on the processor of resource 103, or a processor on a network interface card (NIC), or may be implemented in the hardware of the NIC, or a combination of hardware and software on a NIC or general purpose hardware. Any implementation in hardware and/or software is within the scope of the concepts described herein.

FIG. 1 is meant only to provide an illustration for the application of a system and method according to the concepts described herein and is not meant to be limiting in any way. For example, terminal 101 and resource 103 are only illustrative and not limiting. The principle described herein can be implemented any network connected device having a single or having multiple connections into a network over one or more NICs. The system and method can also be applied to directly connected without intervening routers or switches, such as by direct connections between NICs on the devices. The system and method can be applied to devices that are connected via disparate networks that do not share common resources such as routers and switches, thereby avoiding any single point of failures in the network, such as could occur with router 105 of network 100 in FIG. 1.

Further, the system and method may also be implemented any network device, such as in a terminal such as 101; so that it is not limited to one specific side of a client-to-server path. Further, the system and method may be implemented for path failover either in a host such as 103, which has multiple network connections (NICs), which the host 103 can choose between explicitly, or a host such as 101, which has only one NIC, but which may be able to influence the network path chosen by router 105.

Figure 2:
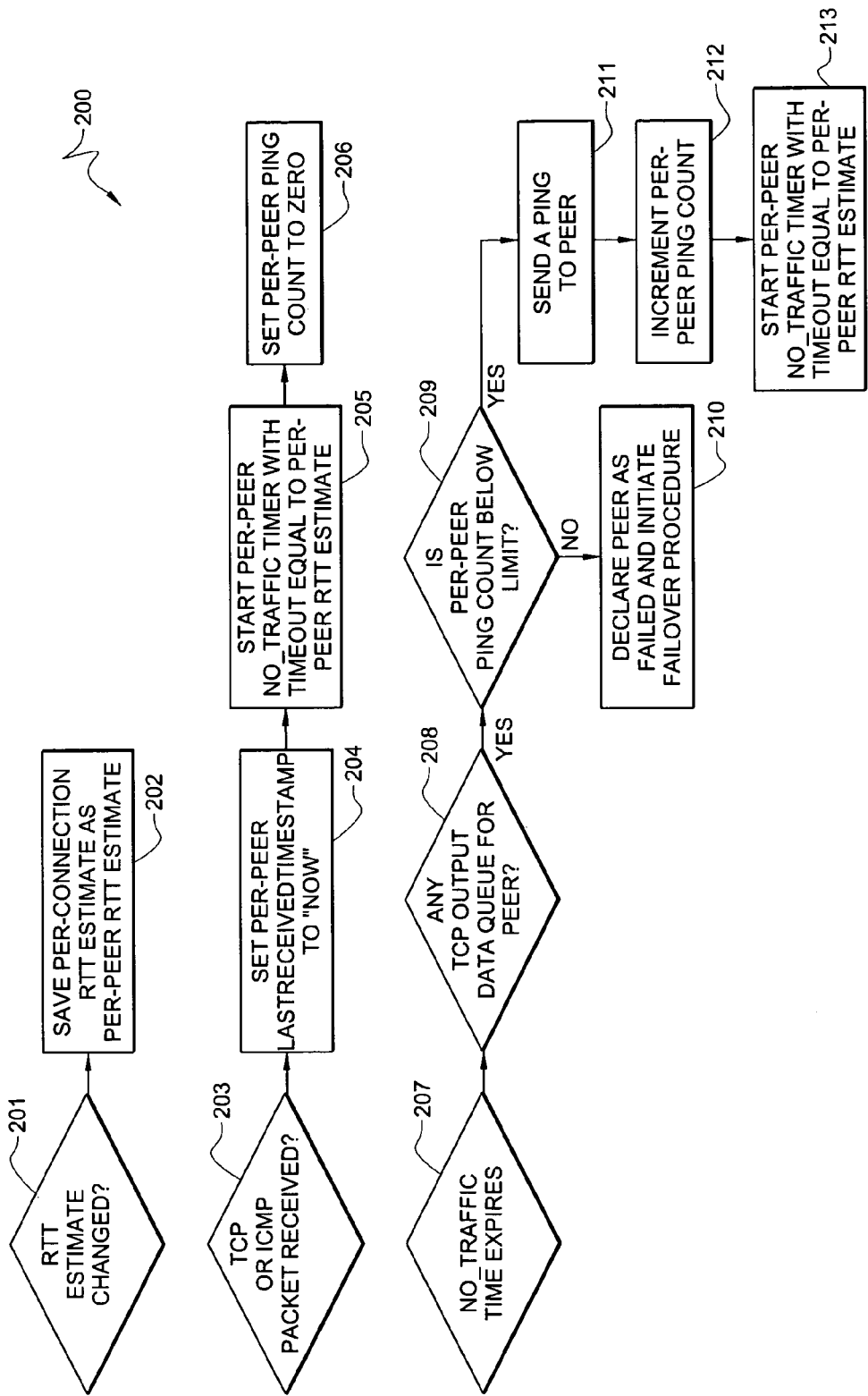
FIG. 2 is an embodiment of a system and method for determination of path failures in a network according to the concepts described herein.

Referring now to FIG. 2, an embodiment of a method for fast path failure detection according to the concepts described herein is shown. Method 200 keeps an estimated round trip timer (RTT) for each peer host for the system. As will be described below, a timer is kept to measure the time between sending a packet and receiving a reply packet over a particular TCP connection. If the actual round trip time for a particular TCP connection is different than the estimated RTT for that peer as shown by process 201, the per-peer RTT estimate is updated with the per-connection RTT estimate, as shown by process 202. Method 200 also monitors for the receipt of TCP packets or ICMP packets over each TCP connection, as shown by process 203. When a packet is received, a per-peer last received time stamp is set to "now", as shown by process 204. The per-peer no-traffic timer is then started in process 205, where the timeout is equal to the per-peer RTT estimate set by process 202. The per-peer ping, or test packet, count is then set to zero by process 206.

Process 207 monitors the no-traffic timer for a connection after it has been started by process 205. When a no-traffic timer expires, as detected by process 207, the method checks to see if there is any TCP output data in the queue for that peer, as shown in process 208. If there is data in the queue, process 209 checks the per-peer ping count. If the ping count is at or above a predetermined limit, the peer is declared as failed, indicated a path failure, and a failover procedure is initiated, as shown by process 210. If the ping count in process 209 is below the limit, a new ping, or test packet, is sent to the peer in process 211, and the per-peer ping count is incremented, as shown in process 212. Process 213 then shows starting the per-peer no-traffic timer with a timeout equal to the per-peer RTT estimate.

Various modifications can be made to method 200 within the scope of the concepts described herein. For example, the no-traffic timer could be set to a value other than the estimated RTT, such as a value based on the no-traffic timer multiplied by a set or adjustable parameter. Setting the parameter to a value greater than 1.0 would causes a slight increase in the time to detect failure, but might reduce the number of false detections. Additionally, method 200 could be modified to detect TCP level failures in addition to, or instead of, IP path failures. In this modification method 200 can recognize that there is a problem with the TCP connection, even though the ping, or test packets, indicated that the IP path is functional.

The peer, or peer host, referenced with regard to method 200 can be a reference, such as an IP address, or a pointer within a software implementation. Which is representative of a path to a peer host, rather than the peer host itself possibly with multiple NICs and IP addresses in the path. The behavior of failover can be implemented to failover all of the TCP connections to the IP address associated with peer host, not just the TCP connections that appear to be in a timeout state. While reference is made to pings, the scope of the concepts described herein is not limited to ICMP ping packets, but includes any probe, test packet or ping packet that is small relative to the available packet size for the system and functions to provide the information required by the method.

Figure 3A:
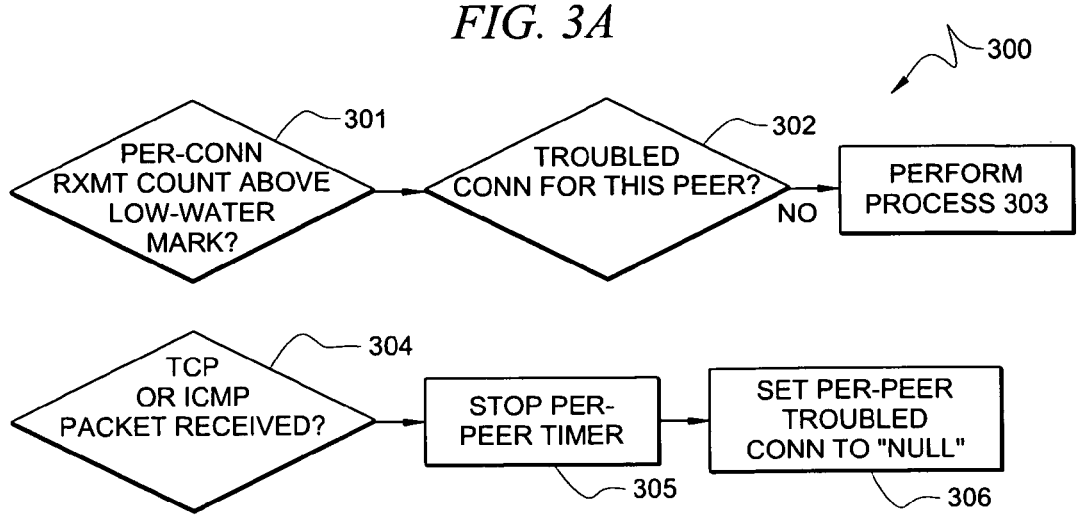
FIG. 3 is an embodiment of a system and method for determination of path failures in a network incorporating offloaded transport protocols according to the concepts described herein.
Figure 3B:
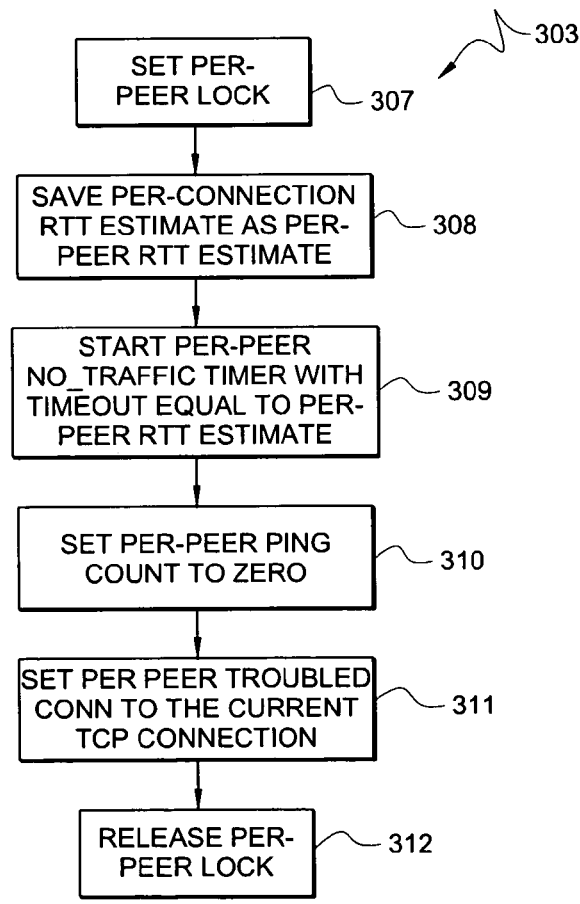
Figure 3C:
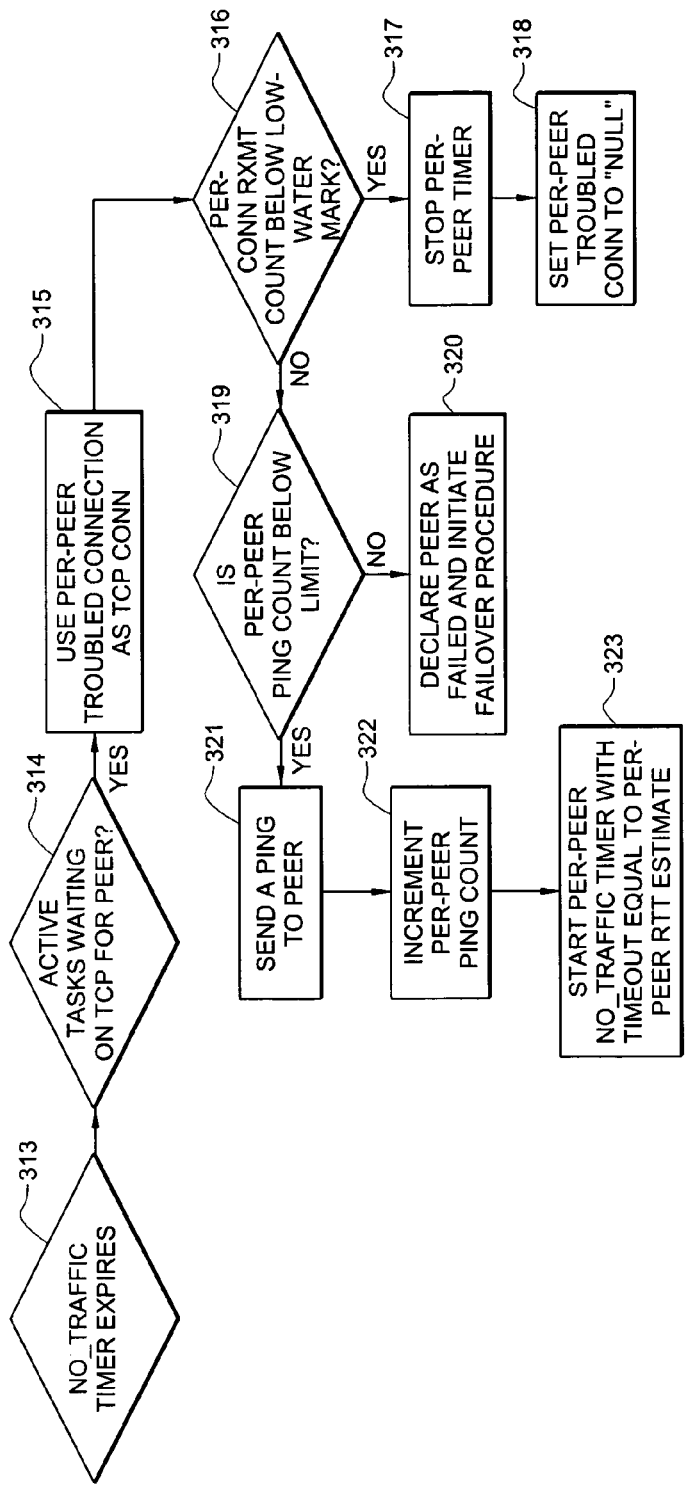
Figure 4:
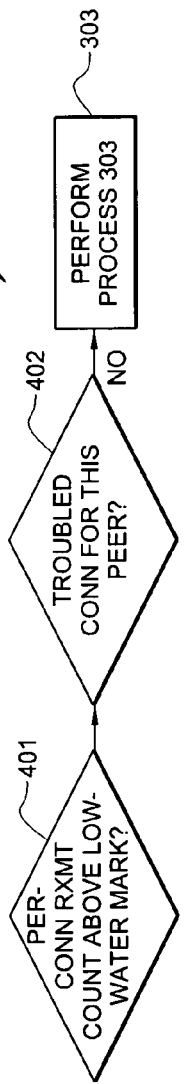
FIG. 4 is an embodiment of a system and method for determination of path failures in a network incorporating in-band probing according to the concepts described herein.
Figure 4B:
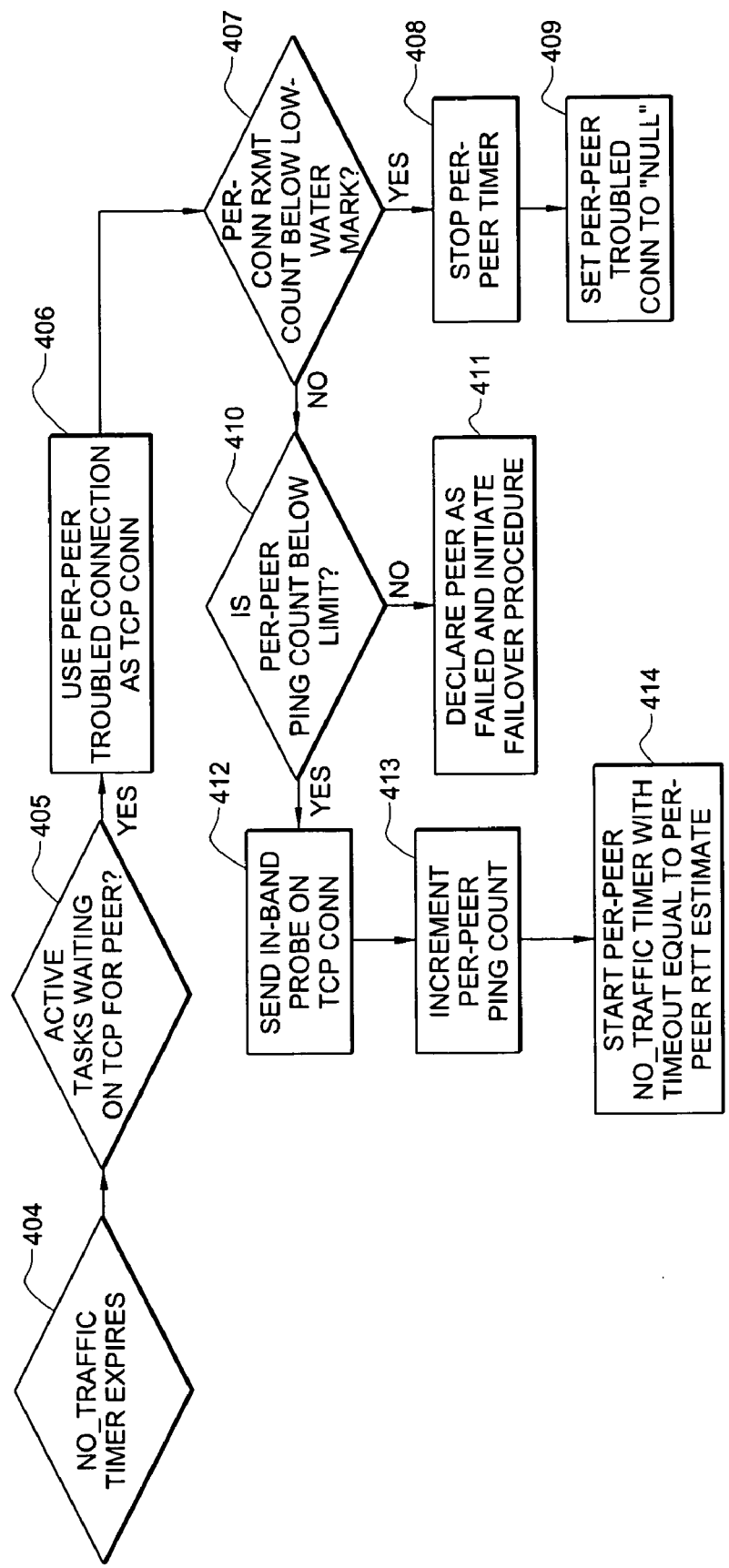

Referring now to FIGS. 3A through C, another embodiment of a system and method of detecting failures is described where the system and method support offloaded transport protocol processing, and minimize the frequency of hardware/software synchronization. Offloaded transport protocol processing can be performed using a TCP Offload Engine (TOE or TOE NIC), or a RDMA NIC (RNIC). TOE describes a well-known embodiment of a TCP stack integrated into a NIC component, while RNIC describes a well-known embodiment of a TCP or SCTP stack integrated into a NIC component, together with an implementation of an RDMA protocol that allows remote hosts to read or write data directly to local memory without requiring CPU involvement.

Method 300 monitors a per-connection retransmit count in process 301 to determine if the count is above a low-water mark. If the count is above the low-water mark, process 302 determines if any connection for this peer has been determined to be troubled. If no connection is troubled, method 300 implements process 303, described in greater detail in FIG. 3B. Process 303 begins with process 307 which sets a lock for the peer. The purpose of the lock is to prevent simultaneous execution of process 303 for more than one connection at time. Process 308 then sets the per-connection RTT estimate as the per-peer RTT estimate in the same matter as described above with reference to FIG. 2. The per-peer no-traffic timer is then set in process 309 with the timeout equal to the per-peer RTT estimate, and the per-peer ping count is set to zero, as shown by process 310. Process 311 then sets the per-peer troubled connection to the current TCP connection before the lock is released in process 312.

Returning to FIG. 3A, method 300 also monitors the connections for the system to determine if a TCP or ICMP packet has been received. If so, the per-peer no-traffic timer is stopped in process 305 and the per-peer troubled connection is set to "no" or "null" for the connection in process 306. Continuing on FIG. 3C, method 300, in process 313, monitors the no-traffic timer set in process 309. If the timer expires, process 314 determines if there are any active tasks waiting on TCP for that peer. If so, process 315 uses the per-peer troubled connection as the TCP connection and determines if the per-connection retransmit count is above the low-water mark in process 316. If the retransmit count is below the low-water mark the timer is stopped in process 317 and the per-peer troubled connection status is set to "null".

If, in process 316 the retransmission count is determined not to be below the low-water mark, process 319 determines if the per-peer ping count is below a predetermined limit. If the ping count is above the limit the peer is declared failed and the failover procedure is initiated by process 320. If the ping count is not above the limit, process 321 sends a ping, or test packet, to the peer and the per-peer ping count is incremented in process 322. The per-peer no-traffic timer is started in process 323 with a timeout equal to the per-peer RTT estimate.

Waiting for the low-water mark number of retransmissions before starting the probes controls the tradeoff between speed of failure detection and possible congestion.

Another embodiment of a path failure detection system and method according to the concepts described herein is shown in FIGS. 4A and B. Method 400 describes an embodiment that is capable of using TCP packet as probes, referred to as in-band probing, instead of ICMP, or ping packets, which may be blocked in the network for security purposes.

In method 400, the "in-band probing" embodiment processes 401 through 414 operate essentially as described with respect to the equivalent process described in method 300 with reference to FIGS. 3A through C, except send ping packet operation is replaced by the following steps: (i) remember a TCP connection to the peer host that appears to be stalled because its retransmission count has exceeded a limit; (ii) check when the no-traffic timer expires to see if that connection is still stalled by rechecking its retransmission count; and (iii) if still stalled, retransmitting a TCP segment containing just one data byte.

The purpose of the one byte TCP segment is to elicit an acknowledgment from the other end, using purely TCP packets, but without sending a long packet. This is similar to the approach used by TCP's keepalive probing mechanism, but without the problems associated with the keepalive mechanism.

It is possible that the remote end would delay its response to such an in-band probe, due to the well-known "delayed ACK mechanism" which can result in acknowledgments (especially for small segments) being delayed by a period of up to 200 msec (or 500 msec, depending on the TCP implementation). This is not a fatal flaw, since such delays are still likely to be shorter than the TCP retransmission timeout, but they might be avoided through a careful choice of which byte is sent. It should be noted that TCP always allows a recipient to send an acknowledgment packet, although it might not be for the most recently-received data. This is because TCP uses a "cumulative acknowledgment" design, in which the recipient acknowledges the highest sequence number for which it is true that all data with that or a lower sequence number has been received.

One difference between the in-band probing case illustrated by method 400 and method 300, is that there is no echo packet as is generated in response to a ping, or ICMP packet as described in processes 304, 305 and 306. Instead, the receipt of recent TCP, or in-band, packets from the remote peer should cause the connection's Retransmit_count field to be reset, which will then lead to the timer being stopped.

There are several alternative embodiments of the in-band probe function illustrated by method 400, in addition to simply sending a normal TCP segment to elicit an acknowledgment. The goal of these variants is to avoid any delay in sending the acknowledgment. One category of alternative embodiments relies on a prior agreement between endpoints to use a non-standard feature of TCP, or rather, to use extended features of TCP in a way contemplated by existing standards but not actually standardized themselves. These alternatives include:

Using one of the "reserved" bits in the TCP header to indicate to the recipient that an acknowledgment should be sent immediately.

Using an unassigned TCP option to indicate to the recipient that an acknowledgment should be sent immediately.

Using a standard TCP Option, such as the Timestanp Option to indicate to the recipient that an acknowledgment should be sent immediately, although without prior agreement it is possible that this standard option would not always result in an immediate (undelayed) acknowledgment.

There may be cases where certain network elements (such as routers or firewalls), especially in, but not limited to, Wide-area Networks (WANs), sometimes drop or improperly modify TCP packets that carry unknown TCP options or that have reserved TCP header bits set. This can result in a network element dropping an in-band probe packet resulting in the sender failing over when the path is operable. While connectivity is not lost, one might end up with a ping-pong failover scenario, in which the sender rapidly alternates between the N usable paths, using each one only until the first prolonged delay in the TCP flow causes the failure-detection mechanism to believe that the path has failed.

To handle that scenario, the embodiment of the system and method described herein can be enhanced to detect this rapid alternation, and then temporarily lengthening the failure-detection window to avoid the oscillation. For example, the "pinglimit" parameter could be increased multiplicatively on each apparent alternation, and decrease it additively (e.g., subtract a small constant) each time an in ping appears to succeed.

Rapid alternation could be detected by numerous means, including but not limited to:

The number of failovers over a chosen time interval (i.e., the rate of failovers) exceeds a chosen limit.

The time between declaring that a given path has failed, and deciding to try it again as the result of having declared the alternative paths as having failed, is below a chosen time limit.

After a path has been declared as failed because no activity has been detected during the chosen interval, packets are then subsequently received from the peer host via that path.

It should be obvious to those skilled in the art that the system and method according to the concepts described herein could be implemented in various combinations of software and hardware both on the host and via offloaded functions, These combinations include, but are not limited to, everything running in host software with a generic NIC, in host software, but standard TCP functions are offloaded, in host software but ICMP is offloaded instead of/in addition to TCP functions, in host software, "in-band-capable" TCP functions are offloaded, all in offloaded systems and/or hardware, or any other combination of hardware and software, host resident or offloaded, as may be contemplated.

What is claimed is:

1. A method for detecting path failure in a network, the method comprising:
   receiving a packet over a particular connection;
   starting a timer for the particular connection;
   in response to the timer expiring,
      checking for outgoing data to still be sent over the particular connection;
      in response to there being outgoing data to still be sent over the particular connection,
         comparing a per-peer count of previously sent test packets against a limit; and in response to the per-peer count being less than the limit, where no response has been received to the previously sent test packets, sending a new test packet on the particular connection, wherein each of the previously sent test packets and the new test packet provides an indication of the state of a network path associated with the particular connection.

2. The method of claim 1 further comprising initiating a failover procedure for a path associated with the particular connection when the count of previously sent test packets is greater than the limit.

3. The method of claim 1 wherein the particular connection is a TCP connection.

4. The method of claim 1 wherein the test packet is a minimal length test packet.

5. The method of claim 1 wherein the test packet is an ICMP ping packet.

6. The method of claim 1 wherein the particular connection is a transport layer connection and the test packet tests network layer connectivity.

7. The method of claim 1 wherein the particular connection is a transport layer connection and the test packet is an in-band packet.

8. The method of claim 1 wherein transport layer functionality is offloaded to a hardware component.

9. The method of claim 8 wherein the hardware component is a network interface card.

* * * * *